United States Patent [19]

Yamato

[11] Patent Number: 4,548,180

[45] Date of Patent: Oct. 22, 1985

[54] METHOD FOR CONTROLLING THE OPERATING CONDITION OF AN INTERNAL COMBUSTION ENGINE

[75] Inventor: Akihiro Yamato, Shiki, Japan

[73] Assignee: Honda Giken Kogyo Kabushiki Kaisha, Tokyo, Japan

[21] Appl. No.: 619,110

[22] Filed: Jun. 11, 1984

[30] Foreign Application Priority Data

Jun. 20, 1983 [JP] Japan ................. 58-110678

[51] Int. Cl.⁴ ............ F02D 11/10; F02D 1/04; F02B 3/00

[52] U.S. Cl. .............. 123/478; 123/339; 123/340; 123/480; 123/492

[58] Field of Search ........... 123/339, 340, 478, 341, 123/480, 492

[56] References Cited

U.S. PATENT DOCUMENTS

| | | | |
|---|---|---|---|
| 4,047,507 | 9/1977 | Nogachi et al. | 123/341 |
| 4,380,979 | 4/1983 | Takase | 123/341 |
| 4,402,289 | 9/1983 | Ikeura | 123/339 |
| 4,421,083 | 12/1983 | Stoltman | 123/339 |
| 4,438,744 | 3/1984 | Husegawa | 123/339 |
| 4,467,761 | 8/1984 | Husegawa | 123/339 |
| 4,469,064 | 9/1984 | Manaka et al. | 123/339 |
| 4,469,074 | 9/1984 | Takao et al. | 123/492 |
| 4,479,186 | 10/1984 | Takao et al. | 123/339 |

*Primary Examiner*—Raymond A. Nelli
*Attorney, Agent, or Firm*—Pollock, Vande Sande and Priddy

[57] ABSTRACT

A control method for an internal combustion engine in which a fuel supply amount is determined in accordance with a detected value of the vacuum in the intake air passage, comprises a first sampling step for sampling the vacuum level in the intake air passage at a first timing synchronized with the engine crankshaft rotation and a second sampling step for sampling the vacuum level at a second timing whose frequency is higher than that of the first timing, and a step for averaging the sampled value of the second sampling step. During an operational state of the engine where the vacuum level in the intake air passage tends to fluctuate, the average value is selected instead of the normal sampled value to determine the fundamental value for the fuel supply amount control.

5 Claims, 11 Drawing Figures

FIG. 1
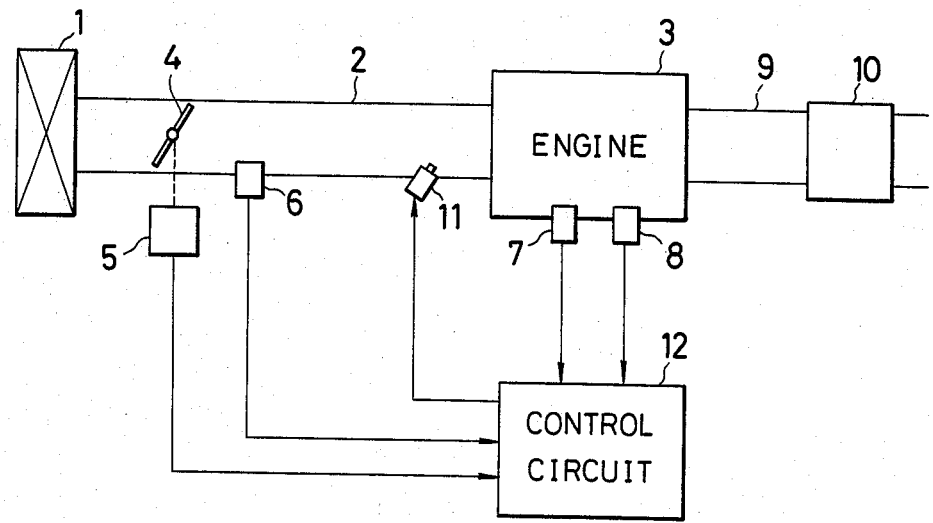
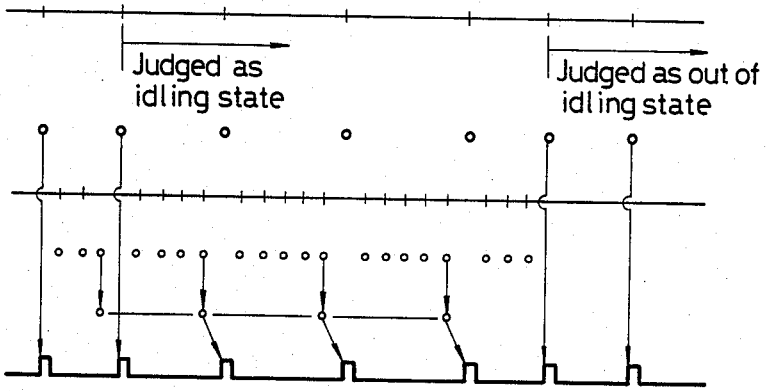

METHOD FOR CONTROLLING THE OPERATING CONDITION OF AN INTERNAL COMBUSTION ENGINE

BACKGROUND OF THE INVENTION

1. Field of the Invention

The present invention relates to a method for controlling the operating condition of an internal combustion engine, and more specifically to a control method in which the operation of the engine is controlled by operating the fuel metering system on the basis of the vacuum level of the intake air passage, downstream of the throttle valve.

2. Description of Background Information

Among methods for controlling the operating condition of an internal combustion engine (referred to simply as an "engine" hereinafter), there is a type which controls the amount of the fuel to be injected to the engine.

In this type of control method, an absolute value of the vacuum level $P_{BA}$ in the intake air passage downstream of the throttle valve and the engine speed are detected, respectively by a pressure sensor and an engine speed sensor. Then a fundamental fuel injection duration Ti is determined in accordance with the output signals of these sensors. Further, an increment or decrement correction coefficient is multiplied to the fundamental fuel injection duration Ti, in accordance with other parameters such as the engine coolant temperature or a transitional change in the engine operation.

In the case of conventional control methods of this type, in determining the fundamental fuel injection duration Ti, a parameter corresponding to the absolute value $P_{BA}$ of the vacuum in the intake manifold is sampled in synchronization with a TDC signal which is indicative of the engine rotation, and the fundamental fuel injection duration Ti is determined in accordance with the thus sampled parameter values.

However, generally the absolute value $P_{BA}$ tends to pulsate during intake strokes of the engine, and in turn, the fundamental fuel injection duration Ti also varies with the pulsation of the absolute value $P_{BA}$. This variation of the fundamental fuel injection duration Ti has resulted in unstable engine operation, especially in a low speed range of engine operation.

SUMMARY OF THE INVENTION

An object of the invention is therefore to alleviate this problem of the conventional method and to provide a method for controlling the engine operating condition in which the stable operation of the engine can be ensured although there is the pulsation of the absolute value $P_{BA}$ of the vacuum in the air intake system.

According to the present invention, a method for controlling the engine operating condition includes the steps of sampling the vaccum level in the intake air passage at a first sampling timing synchronized with the engine rotation, further sampling the vacuum level in the intake air passage with a second sampling timing whose frequency is higher than the frequency of the first sampling timing synchronized with the engine rotation, averaging the sampled values obtained by the sampling step of the second sampling timing, selecting one of the sampled values obtained by the sampling step of the first sampling timing and the average value of the sampled values obtained by the sampling step of second sampling timing, according to the engine operating condition, and determining the amount of control in accordance with the value selected by the selection step.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects and advantages of the invention will become more clearly understood from the following description taken in conjunction with the accompanying drawings which are given by way of illustration only, and thus are not limitative of the present invention, and wherein;

FIG. 1 is a schematic diagram of an electronically controlled fuel supply system to which the control method according to the present invention is applied;

FIGS. 3a through 3f is a timing chart showing the operation of the control circuit;

DETAILED DESCRIPTION OF THE PREFERRED EMBODIMENT

Figure 2:
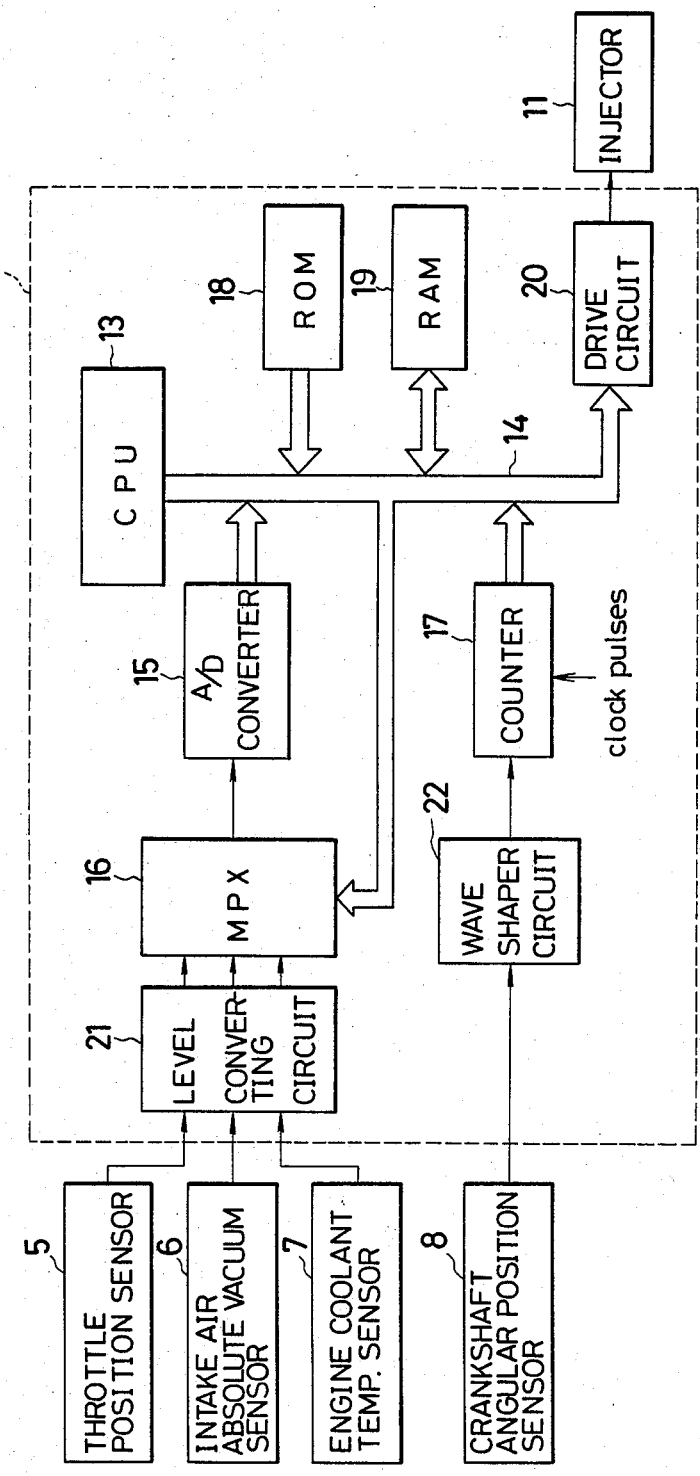
FIG. 2 is a block diagram showing an example of the construction of the control circuit of FIG. 1.

Reference is first made to the schematic diagram of FIG. 1, which shows an example of an air induction and fuel supply system of an internal combustion engine. As shown, the intake air taken at an air filter 1 is supplied to an engine 3 via an intake air passage 2. The amount of the intake air flowing through the intake air absolute pressure sensor b is a provided to the intake air passage 2 is controlled by a throttle valve 4 disposed in the intake air passage 2. The throttle valve 4 is provided with a throttle opening sensor 5 which, for example, is made up of a potentiometer and produces an output signal having a voltage level indicative of the opening degree of the throttle valve 4. An intake air absolute pressure sensor 6 is provided to the intake air passage 2 so as to provide an output signal whose voltage level is indicative of the absolute value of the vacuum in the intake air passage, downstream from the throttle valve 4. Further, the engine 3 is provided with an engine coolant temperature sensor 7 which produces an output signal whose voltage level is proportional to the engine coolant temperature, and a crankshaft angular position sensor 8 which produces an output pulse signal (referred to as TDC signal hereinafter) when a crankshaft (not shown) is at a predetermined angular position slightly before the mechanical top dead center (TDC) position. Exhaust gas from the engine 3 is discharged through an exhaust pipe 9 on which a three-way catalytic converter 10 is mounted. The fuel is supplied to the engine 3 through an injector 11 which is provided per cylinder and disposed in the intake air passage 2 in the vicinity of an air intake valve, and supplies the fuel to the engine 3 in an amount proportional to the duration of an input pulse signal. Output signals from the throttle position sensor 5, intake air absolute vacuum sensor 6, engine coolant temperature sensor 7, and the crankshaft angular position sensor 8 are applied to a control circuit 12.

The control circuit 12 is for example, made up of a so called microcomputer and executes the calculation in accordance with a predetermined program which will be described later. The calculation is effected as to the fundamental fuel injection duraction Ti and a fuel injection time duration Tout which is obtained by multiplying the fundamental fuel injection time duration Ti by an increment correction coefficient or a decrement correction coefficient, and corresponds to the amount of the fuel to be injected.

FIG. 2 is the block diagram showing a more detailed construction of the control circuit 12. As shown, the control circuit 12 includes a CPU (Central Processing Unit) 13 which executes a digital calculation process in accordance with a program which will be described later. An input/output bus 14 is connected to the CPU 13 and data signals and address signals are applied and output therethrough. To the input/output bus 14, there are connected an A/D converter 15, and MPX (Multiplexer) 16, a counter 17, a ROM (Read Only Memory) 18, a RAM (Random Access Memory) 19, and a drive circuit 20 of the injector 11. The MPX 16 is a switch for selectively transmitting one of the output signals from the throttle position sensor 5, the intake air absolute pressure sensor 6, and engine coolant temperature sensor 7 to the A/D converter 15 through a level converting circuit 21, in accordance with a command from the CPU 13. The counter 17 is adapted to count clock pulses applied between each of the output pulse signals from the crankshaft angular position sensor 8 which are applied through a wave shaper circuit 22.

Figure 4:
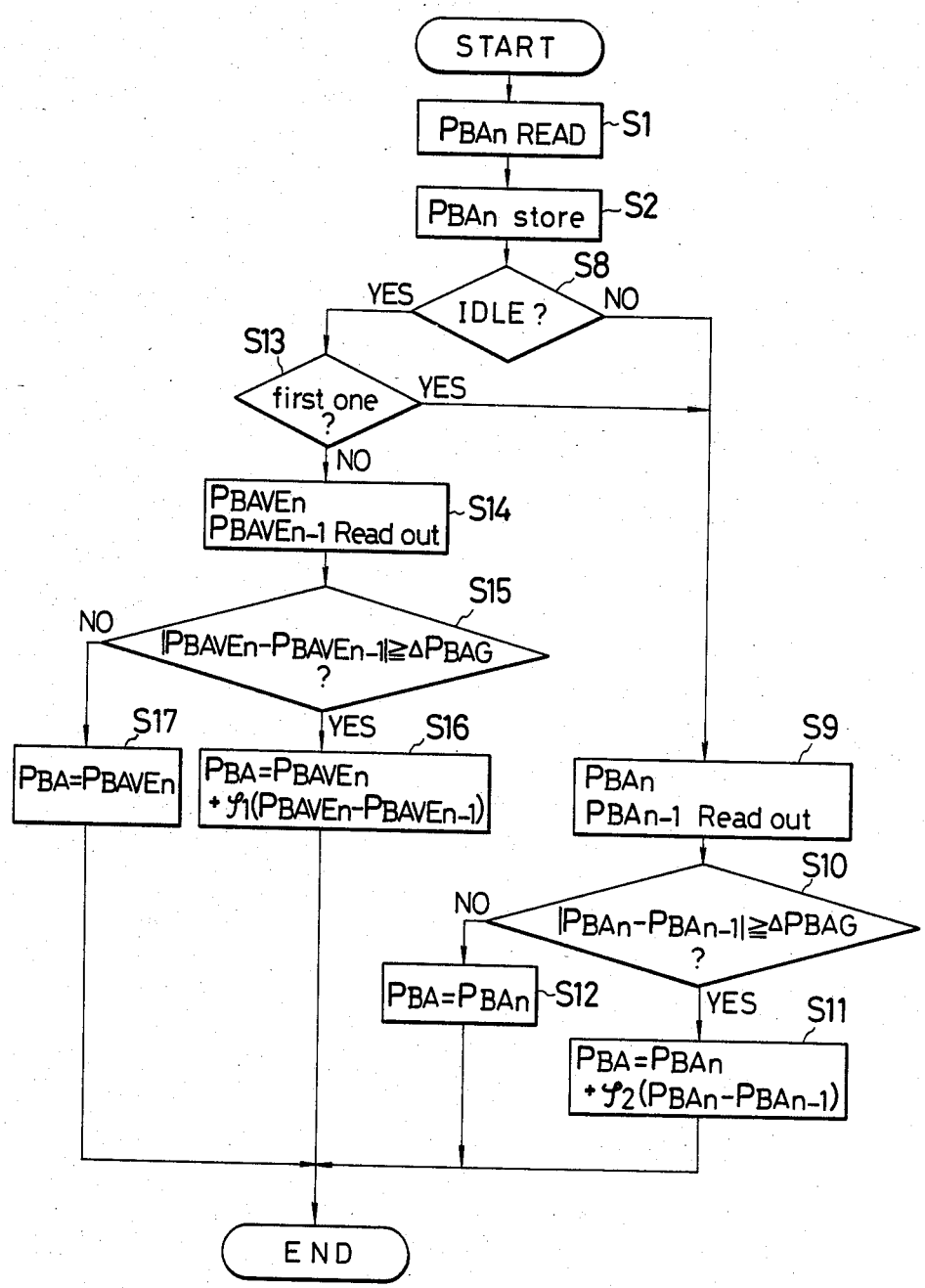
FIG. 4 is a flow chart showing the order of operation of the control method according to the present invention.
Figure 5:
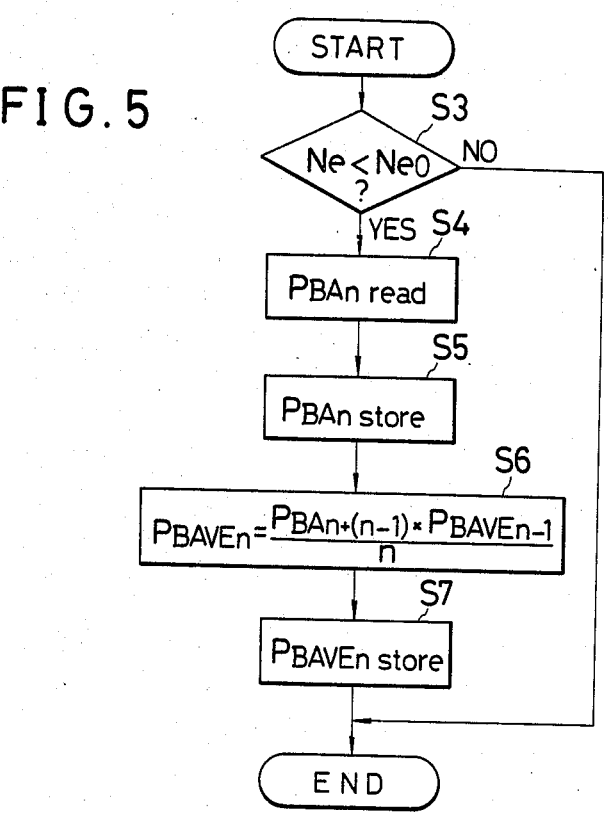
FIG. 5 is a flow chart showing the manner of calculation of the average value $P_{BAVEn}$ according to the present invention.

The order of control operations according to the present invention will be further explained by means of the timing chart of FIG. 3, with reference to the flow charts of FIGS. 4 and 5. In FIG. 4, the detection signal corresponding to the absolute vaccum $P_{BA}$ in the intake pipe which is detected by the intake air absolute vacuum sensor 6 is sampled (FIG. 3B) in the control circuit 12 at a timing (referred to as synchronizing timing hereinafter) of the TDC signal (FIG. 3A) generated from the crankshaft angular position sensor 8 which is synchronized with the engine rotation, so that the latest sampling value $P_{BAn}$ is read (at a step S1) and stored in the RAM 19 of the control circuit 12 (at a step S2).

On the other hand, as shown in FIG. 5, the control circuit 12 further judges, at a step S3, whether or not the detected engine speed Ne is lower than a predetermined reference engine speed Ne0, 1500 r.p.m. for instance. If the detected engine speed is lower than the reference engine speed, the control circuit 12 samples (FIG. 3D) the output signal of the absolute vacuum sensor 6 at a timing whose period is shorter than that of the synchronizing timing (FIG. 3C, referred to simply as "timing of shorter period" hereinafter). As shown in FIG. 5, the control circuit 12 reads the most recently sampled value $P_{BAn}$ at a step S4 and stores the sampled value $P_{BAn}$ in the RAM 19 (step S5). At the same time, the control circuit 12 calculates the average value $P_{BAVEn}$ of the sampled value at a step S6.

The average value $P_{BAVEn}$ is derived from values sampled a predetermined number of times at the timing of shorter period during a time period until immediately before the generation of the TDC signal. The calculation is performed in accordance with the following equation:

$$P_{BAVEn} = P_{BAn} + (n-1) \times P_{BAVEn-1}/n \qquad (1)$$

in which $P_{BAVEn-1}$ is an average value previously calculated, and n is a number of times of reading.

Further, it is desirable that more than ten times of reading is possible when the engine speed Ne is lower than 1000 r.p.m.

The control circuit 12 processes the sampled value $P_{BA}$ (one byte value) as two byte value. As an example, if $P_{BA} = 2A$, the value is processed as $P_{BA} = 2A00$. Then the control circuit 12 temporarily stores the calculated average value $P_{BAVEn}$ in the RAM 19 to the second decimal place.

In FIG. 4, after memorizing the most recent sampled value $P_{BAN}$, whether the engine is operating at the idling state or not is detected at a step S8. If the engine is not idling, the latest sampled value $P_{BAn}$ and the preceded sampled value $P_{BAn-1}$ are read-out from the RAM 19 at a step S9. A difference between these sampled values $P_{BAn}$ and $P_{BAn-1}$ is calculated and further, the absolute value of this difference is compared with a predetermined value $\Delta P_{BAG}$ at a step S10, where $\Delta P_{BAG}$ is referred to as "guard value" which is obtained by multiplying a minimum resolution of the absolute pressure by a predetermined numeral including 1.

If $|P_{BAn} - P_{BAn-1}| \geq \Delta P_{BAG}$, the most recent sampled value $P_{BAn}$ is corrected so as to be a value $P_{BAn} + \phi 2 (P_{BAn} - P_{BAn-1})$ at a step S11. On the basis of this corrected value, the fundamental fuel injection duration Ti is determined by looking up a map (table) stored in the ROM 18. In the above equation, $\phi 2$ is a constant determined with regard to a difference between the pressure level detected by the vacuum sensor 6 and the pressure level at an instant when the result of the calculation is utilized. Further, the table (map) look up is performed synchronously with the TDC signal.

If $|P_{BAn} - P_{BAn-1}| < \Delta P_{BAG}$, then the most recent sampled value is not corrected at all, at a step S12, and used in the calculation for the determination of the fundamental fuel injeciton duration Ti.

On the other hand, if the engine 3 is idling, whether the sampling of $P_{BA}$ at the synchronizing timing is the first one or not is detected a step S13. If the sampling is the first one, the calculation goes to the step S9 in which the fundamental fuel injection duration is determined in accordance with the most recent sampled value $P_{BAn}$. If, on the other hand, the sampling is the second one or a later one, the most recent average value $P_{BAVEn}$ and the average value $P_{BAVEn-1}$ previously calculated according to the flow chart of FIG. 5 and stored in the RAM 19 are read-out from the RAM 19 at a step S14. A difference between the average values is calculated and this difference is then compared, at a step S15, with the guard value $\Delta P_{BAG}$.

If $|P_{BAVEn} - P_{BAVEn-1}| \geq \Delta P_{BAG}$, then the most recent calculated average value is corrected at a step S16, so as to be a value $P_{BAVEn} + \phi 1 (P_{BAVEn} - P_{BAVEn-1})$, and the fundamental fuel injection time duration Ti is determined at each synchronizing timing by looking up the map stored in the ROM 18, on the basis of the thus corrected average value. In the above equation, $\phi 1$ is a constant whose value is determined as well as the constant $\phi2$, with regard to the difference between the detected pressure level and the pressure level of the time when the calculated result is utilized, and further set so that there is a relation of $\phi1>\phi2$. As for the decimal fraction of the calculated average value, after the correction operation, a value within 00 and 7F are omitted and a value within 80 and FF is raised to the unit. In addition, if $|P_{BAVEn}-P_{BAVEn-1}|<\Delta P_{BAG}$, the newest one of lately calculated average value is not corrected at all, at a step S17, and only the decimal fragment of the average value is treated in the same manner as the previous case, and used in the calculation for determining the fundamental fuel injection duration Ti at each synchronizing timing.

Figure 6:
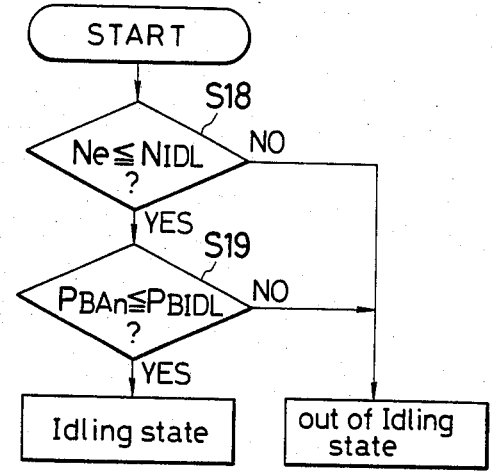
FIG. 6 is a flow chart showing the details of the step for detecting the idling condition of the engine according to the present invention.

The determination as to whether the engine is idling or not is performed in steps S18 and S19 of the flow chart of FIG. 6. Specifically, the idling state is determined as a state in which the engine speed Ne is below a predetermined speed of rotation (for example 1000 r.p.m.) and at the same time, the sampled value detected at each synchronizing timing $P_{BAn}$ is below a predetermined value $P_{BIDL}$. On the other hand, the engine is determined to be operating out of the idling state when the engine speed Ne exceeds the predetermined level, or when the sampling value $P_{BAn}$ exceeds the predetermined value $P_{BIDL}$ even if the engine speed Ne is below the predetermined value $N_{IDL}$.

In addition, the sampling of the shorter period can be performed by shortening the period of the background routine, or at a period determined by a timer means.

It will be appreciated from the foregoing that, according to the present invention, the vacuum pressure in the intake air passage is sampled at a synchronizing timing synchronized with the rotation of the engine crankshaft, and the vacuum pressure within the intake air passage is further detected with a period higher than the synchronizing timing, and the sampled values are averaged, one of the sampled values of the synchronizing timings and the averaged values of the values sampled with the higher frequency is selected, and the control amount is determined by means of the thus selected value. Thus, the stable state of the engine operation is ensured throughout the engine speed range from a low engine speed to a high engine speed, even if the vacuum pressure in the intake air passage fluctuates.

What is claimed is:

1. A method for determining the control amount of at least one parameter that is used to control the operating condition of an internal combustion engine, in which the operating condition of the engine is controlled in accordance with a detected value of vacuum level in an intake air passage, downstream of a throttle valve, comprising;
    a first sampling step for sampling the vacuum level in the intake air passage of the engine at a first sampling timing synchronized with the rotation of the engine crankshaft;
    a second sampling step for sampling the vacuum level in the intake air passage of the engine at a second sampling timing whose frequency is higher than the sampling timing of the first sampling step;
    an averaging step for averaging a predetermined number of the sampled values of the vacuum level obtained by the second sampling step to generate an average value;
    a selection step for selecting one of a sampled value obtained by the first sampling step and the said average value in response to at least one operating condition of the engine, and
    a control step for determining the control amount by a selected value obtained by the selecting step.

2. A control method for an internal combustion engine as set forth in claim 1, in which said at least one operating condition of the engine is an idling state of the engine, and the average value is selected if the engine is idling.

3. A control method for an internal combustion engine, as set forth in claim 1, wherein said at least one operating condition of the engine is detected at said first sampling timing synchronized with the rotation of the crankshaft of the engine.

4. A control method for an internal combustion engine, as set forth in claim 2, wherein said at least one operating condition of the engine is detected at said first sampling timing synchronized with the rotation of the crankshaft of the engine.

5. A control method for an internal combustion engine, as set forth in claim 1, wherein said control amount is determined each time of said first sampling timing, and said average value is calculated by using the sampled values of said second sampling step, sampled a predetermined number of times until a time immediately before said first sampling timing.

* * * * *